(12) United States Patent
Zapf et al.

(10) Patent No.: US 9,857,274 B2
(45) Date of Patent: Jan. 2, 2018

(54) SENSOR MODULE WITH A DISPLACEMENT SENSOR AND A PRESSURE SENSOR IN A COMMON HOUSING

(71) Applicant: Tyco Electronics AMP GmbH, Bensheim (DE)

(72) Inventors: Joachim Zapf, Limburgerhof (DE); Bernd Hoffelder, Roemerberg (DE)

(73) Assignee: TE Connectivity Germany GmbH, Bensheim (DE)

( * ) Notice: Subject to any disclaimer, the term of this patent is extended or adjusted under 35 U.S.C. 154(b) by 450 days.

(21) Appl. No.: 14/360,579

(22) PCT Filed: Nov. 26, 2012

(86) PCT No.: PCT/EP2012/073577
§ 371 (c)(1),
(2) Date: May 23, 2014

(87) PCT Pub. No.: WO2013/079434
PCT Pub. Date: Jun. 6, 2013

(65) Prior Publication Data
US 2014/0320118 A1 Oct. 30, 2014

(30) Foreign Application Priority Data
Nov. 28, 2011 (DE) .................. 10 2011 087 241

(51) Int. Cl.
*G01L 19/00* (2006.01)
*G01M 17/007* (2006.01)
(Continued)

(52) U.S. Cl.
CPC ........... *G01M 17/007* (2013.01); *G01B 7/003* (2013.01); *G01D 11/245* (2013.01); *G01D 21/02* (2013.01);
(Continued)

(58) Field of Classification Search
CPC ..... F16D 2500/1086; F16D 2500/3024; F16D 2500/3026; G01L 19/0092; G01M 17/007; G01D 11/245; G01D 21/02; G01B 7/003
See application file for complete search history.

(56) References Cited

U.S. PATENT DOCUMENTS 2,909,062 A * 10/1959 Curtis ................. G01L 9/0083
338/133
5,100,347 A 3/1992 Malasky, III et al.
(Continued)

FOREIGN PATENT DOCUMENTS

EP 2058631 A1 5/2009
EP 2072968 A2 6/2009

OTHER PUBLICATIONS

International Search Report and Written Opinion issued by the European Patent Office, dated Apr. 23, 2013, for related International Application No. PCT/EP2012/073577; 16 pages.
(Continued)

*Primary Examiner* — Robert R Raevis
(74) *Attorney, Agent, or Firm* — Faegre Baker Daniels LLP

(57) ABSTRACT

A sensor module comprises a housing in which a first displacement sensor and a first pressure sensor are arranged. The sensor module can have a second displacement sensor and a second pressure sensor. The module is being provided to monitor a coupling of a motor vehicle, for example a dual coupling of a lorry.

20 Claims, 11 Drawing Sheets

(51) Int. Cl.
*G01D 11/24* (2006.01)
*G01D 21/02* (2006.01)
*G01B 7/00* (2006.01)

(52) U.S. Cl.
CPC .. *F16D 2300/18* (2013.01); *F16D 2500/1086* (2013.01); *F16D 2500/3024* (2013.01); *F16D 2500/3026* (2013.01)

(56) References Cited

U.S. PATENT DOCUMENTS

| | | | |
|---|---|---|---|
| 5,548,996 A | 8/1996 | Shinjo | |
| 2002/0017032 A1* | 2/2002 | Nishina | G01B 3/18 33/815 |
| 2002/0062714 A1 | 5/2002 | Albert et al. | |
| 2012/0330599 A1* | 12/2012 | Roberts | G01R 33/0064 702/150 |

OTHER PUBLICATIONS

International Preliminary Report on Patentability issued by The International Bureau of WIPO, Geneva, Switzerland, dated Jun. 3, 2014, for International Application No. PCT/EP2012/073577; 11 pages.

* cited by examiner

SENSOR MODULE WITH A DISPLACEMENT SENSOR AND A PRESSURE SENSOR IN A COMMON HOUSING

BACKGROUND

The present invention relates to a sensor module.

Various configurations of sensor modules are known from the prior art. It is known to monitor couplings of motor vehicles, in particular couplings of lorries, using sensor modules. In the prior art, movement of the coupling is monitored with a displacement sensor. The displacement sensor in this instance may be, for example, a permanent-magnetic linear contactless displacement sensor (PLCD sensor) or a Hall sensor.

It is further known from the prior art to provide motor vehicles with dual couplings. Such dual couplings are also monitored in the prior art by means of sensor modules which have one or more displacement sensors.

SUMMARY

The object of the present invention is to provide an improved sensor module. This object is achieved with a sensor module having the features of claim 1. Preferred developments are set out in the dependent claims.

A sensor module according to the invention comprises a housing in which a first displacement sensor and a first pressure sensor are arranged. Advantageously, the sensor module may then detect both a spatial position and a pressure, without a plurality of sensor modules being necessary for this purpose.

In a preferred embodiment of the sensor module, the first displacement sensor is a permanent-magnetic linear contactless displacement sensor. Advantageously, the displacement sensor then operates in a contactless manner so that no mechanical interaction is required between the displacement sensor and a measurement object which is monitored by the displacement sensor. Advantageously, the displacement sensor is not then subjected to substantial wear, which ensures long service-life and a high level of reliability.

The displacement sensor preferably has a coil having a magnetically soft core and an evaluation circuit. The displacement sensor is then advantageously also suitable for measurements under unfavourable environmental conditions.

In a preferred embodiment of the sensor module, it has a first pressure adapter which is arranged at an outer side of the housing and by means of which the first pressure sensor can be acted on with a pressure. Advantageously, the sensor module can then be connected to a container via the first pressure adapter in an air-conducting manner in order to measure a pressure in this container.

In a development of the sensor module, the sensor module has a second displacement sensor, a second pressure sensor and a second pressure adapter. Advantageously, the sensor module is then suitable for monitoring two independent positions and two pressures.

In a development of the sensor module, it has a cable which leads into the housing, a tension relief member for the cable being moulded on the housing. Advantageously, the sensor module can be connected via the cable to a control device or another evaluation unit. The tension relief member advantageously prevents the sensor module from becoming damaged by a force which acts on the cable.

In a preferred embodiment of the sensor module, the housing has a cable adapter through which the cable is guided into the housing. The position of the cable is advantageously fixed by means of the cable adapter. Furthermore, a tension relief member for the cable can be moulded on the cable adapter in a particularly simple manner.

The housing of the sensor module preferably comprises a frame, a base plate and a cover plate. The housing of the sensor module can then advantageously be readily assembled.

The first pressure adapter is preferably arranged on the base plate.

In one embodiment of the sensor module, the frame and the base plate are constructed integrally. Advantageously, the number of components required for the production of the sensor module is thereby reduced, which enables cost-effective production of the sensor module.

In a development of the sensor module, the base plate has a recess which can be closed by means of a cover. Advantageously, the cable can then be fixed through the recess during the moulding of a tension relief member. Subsequently, the recess can advantageously be closed with the cover.

In another embodiment of the sensor module, the frame and the base plate are constructed in a separable manner. Advantageously, the cable of the sensor module can then be fixed relative to the frame in order to produce the tension relief member. The frame can subsequently be connected to the base plate and the cover plate.

In an embodiment of the sensor module, it is provided to monitor a coupling of a motor vehicle. Advantageously, the sensor module can at the same time sense a position using the displacement sensor and a pressure using the pressure sensor. The position may, for example, be a position of the coupling. The pressure may, for example, be a pressure of a pneumatic actuator for controlling the coupling. In this instance, by measuring both the local position and the pressure, a redundancy is advantageously achieved during the monitoring of the coupling.

BRIEF DESCRIPTION OF THE DRAWINGS

The invention is explained in greater detail below with reference to Figures, in which.

DETAILED DESCRIPTION

Figure 1:
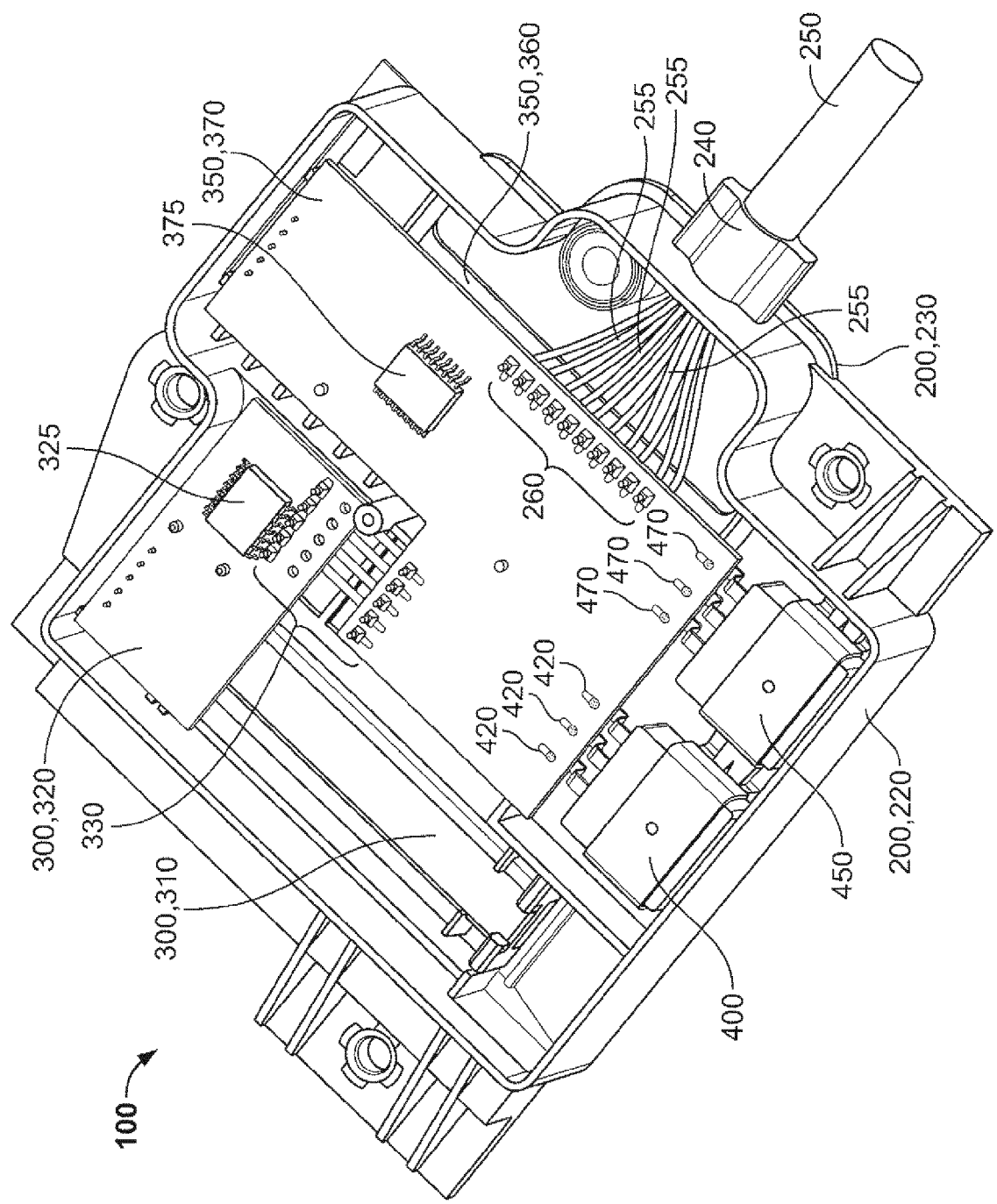
FIG. 1 is a view of a sensor module according to a first embodiment from above.
Figure 2:
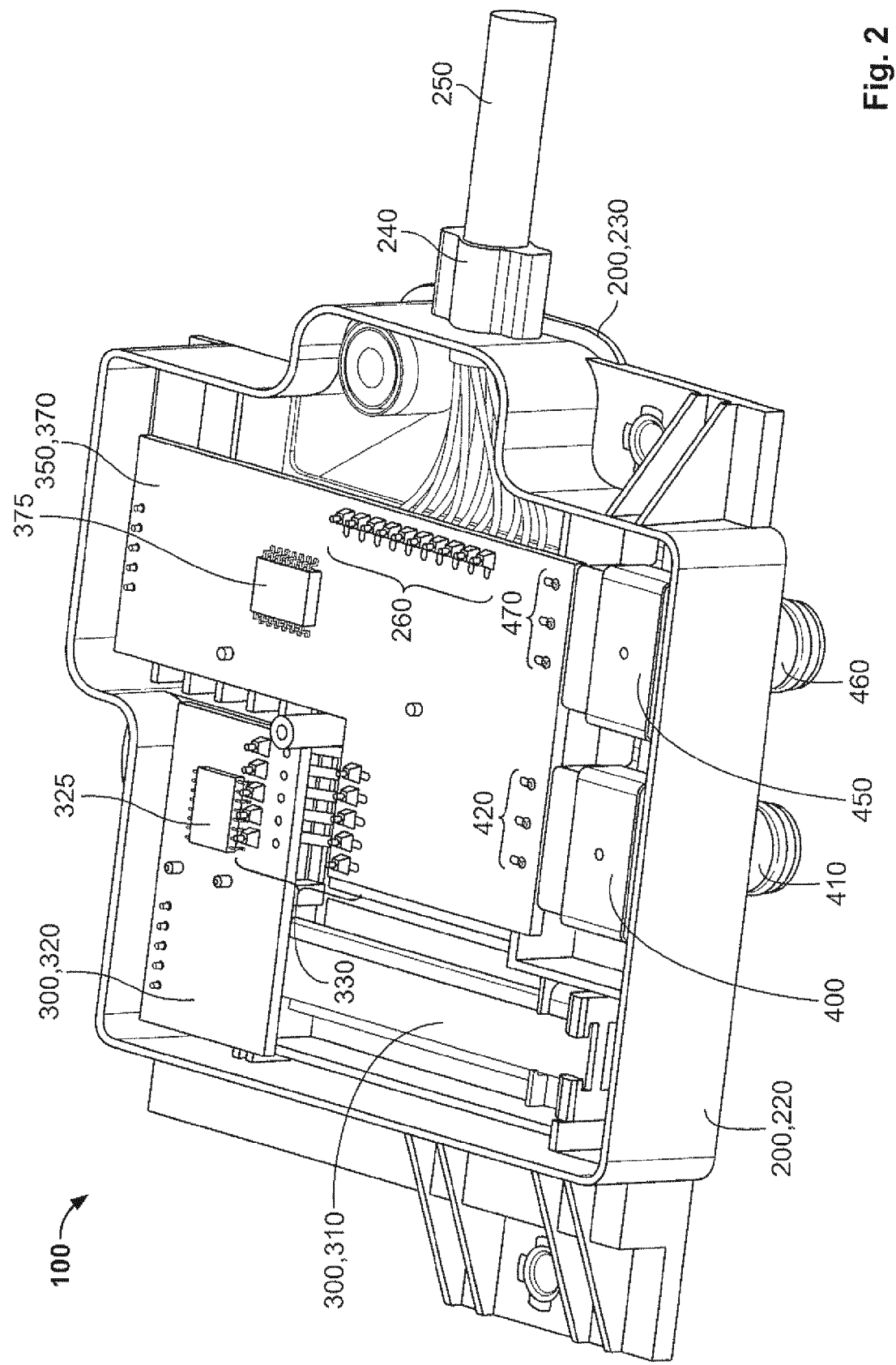
FIG. 2 is another view of the sensor module from above.

FIG. 1 is a perspective view of a sensor module 100 according to a first embodiment. FIG. 2 is another illustration of the sensor module 100 from another perspective. The sensor module 100 is provided for measuring two positions using second displacement sensors and for measuring two pressures using second pressure sensors. The sensor module 100 may, for example, be used for monitoring a coupling of a motor vehicle. The sensor module 100 is suitable in particular for monitoring a dual coupling of a lorry.

The sensor module 100 has a housing 200 which is illustrated in the open state in FIGS. 1 and 2. The housing 200 comprises a base plate 230, a frame 220 and a cover plate 210 which is not illustrated in FIGS. 1 and 2 and which can be seen in FIG. 4. The housing 200 preferably comprises an electrically insulating material, for example, a plastics material.

The cover plate 210 and the base plate 230 are each constructed in a substantially planar manner and form two mutually parallel walls of the housing 200. The frame 220 has a substantially hollow-cylindrical shape and forms lateral walls of the housing 200 that connect the cover plate 210 and the base plate 230 to each other. In the sensor module 100 according to the first embodiment, the base plate 230 and the frame 220 of the housing 200 are constructed in an integral manner. The frame 220 and the base plate 230 thus form a common component and cannot be separated from each other.

A first displacement sensor 300 and a second displacement sensor 350 are arranged inside the housing 200 of the sensor module 100. In the illustrated embodiment, the first displacement sensor 300 and the second displacement sensor 350 are permanent-magnetic linear contactless displacement sensors (PLCD sensors). However, the first displacement sensor 300 and/or the second displacement sensor 350 could also be a different type of displacement sensor, for example, Hall sensors.

The first displacement sensor 300 which is constructed as a permanent-magnetic linear contactless displacement sensor (PLCD sensor) comprises a first measurement coil 310. The first measurement coil 310 has an elongate magnetically soft core which is surrounded over the entire length thereof by a primary coil and which has at the ends two evaluation coils. The first measurement coil 310 of the first displacement sensor 300 consequently corresponds to the prior art. The second displacement sensor 350 which is constructed as a PLCD displacement sensor has a second measurement coil 360 which corresponds to the first measurement coil 310. The first measurement coil 310 and the second measurement coil 360, as illustrated, may be orientated parallel with each other. The first measurement coil 310 and the second measurement coil 360 may, however, also have a different mutual orientation.

The first displacement sensor 300 further comprises a first printed circuit board 320, on which an evaluation circuit in the form of a first integrated switching circuit 325 is arranged. The first integrated switching circuit 325 may be constructed, for example, as an application-specific integrated circuit (ASIC). The second displacement sensor 350 accordingly has a second printed circuit board 370, on which an evaluation circuit in the form of a second integrated switching circuit 375 is arranged. The second integrated switching circuit 375 may also be constructed as an application-specific integrated circuit (ASIC). The first printed circuit board 320 of the first displacement sensor 300 and the second printed circuit board 370 of the second displacement sensor 350 are electrically connected to each other by means of an intermediate connection 330. Via the intermediate connection 330, electrical signals can be transmitted between the first printed circuit board 320 and the second printed circuit board 370.

In an alternative embodiment of the sensor module 100, the first displacement sensor 300 and the second displacement sensor 350 have only one common printed circuit board. The common printed circuit board may have separate evaluation circuits or a common evaluation circuit for both displacement sensors 300, 350.

Figure 3:
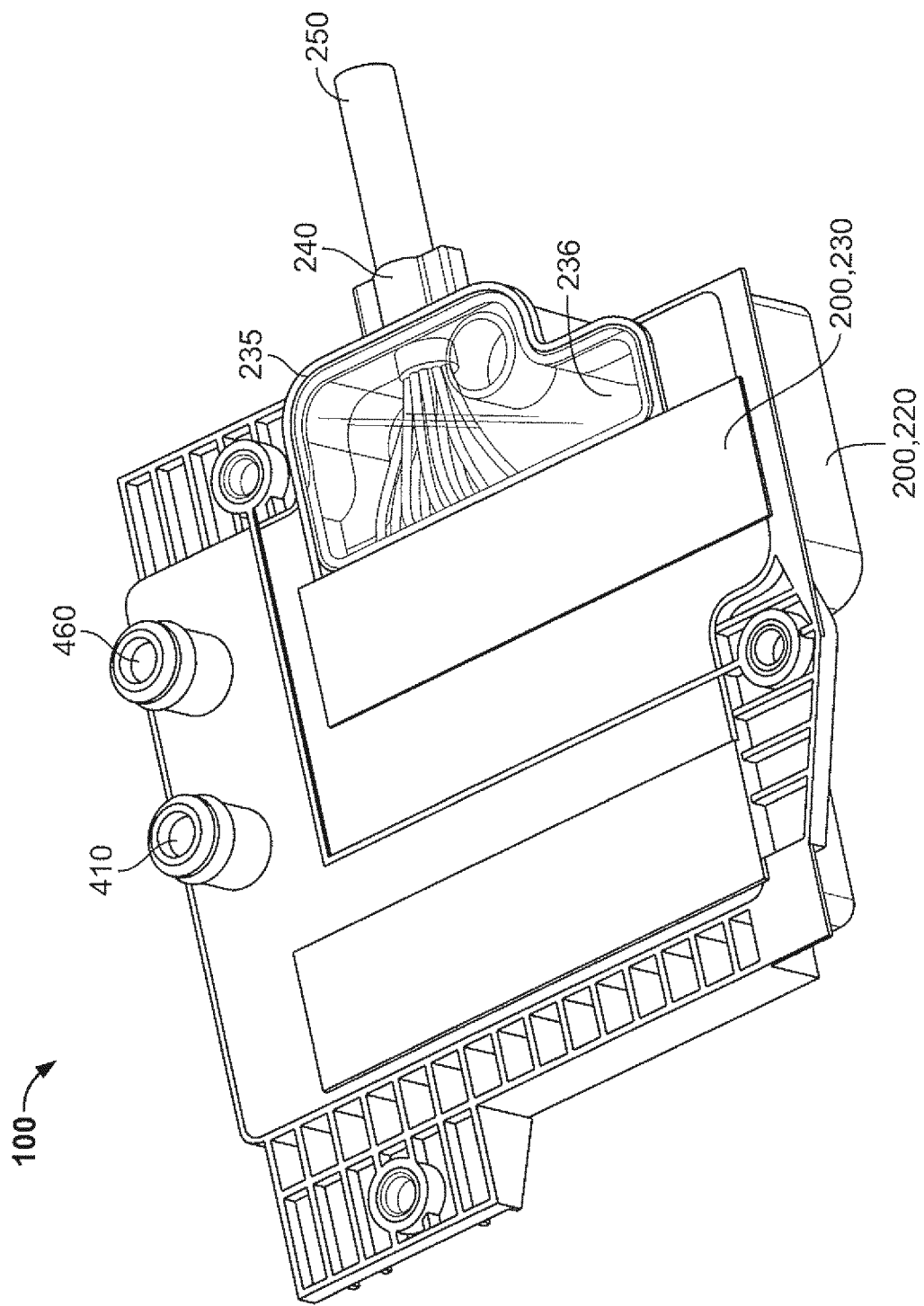
FIG. 3 is a view of the sensor module from below.

A first pressure sensor 400 and a second pressure sensor 450 are further arranged in the housing 200 of the sensor module 100. In FIGS. 2 and 3 it can be seen that the base plate 230 of the housing 200 of the sensor module 100 has a first pressure adapter 410 and a second pressure adapter 460. The pressure adapters 410, 460 are arranged perpendicularly on the base plate 230. Between the first pressure adapter 410 and the first pressure sensor 400, there is a fluid-conducting connection. Between the second pressure adapter 460 and the second pressure sensor 450, there is also a fluid-conducting connection. The first pressure adapter 410 and the second pressure adapter 460 could also be arranged at a location of the housing 200 other than on the base plate 230.

Via the first pressure adapter 410, the first pressure sensor 400 can be acted on with pressure. The first pressure sensor 400 is constructed to quantify this pressure which is supplied to it. For example, the first pressure sensor 400 may be connected via the first pressure adapter 410 to a container so as to conduct air in order to measure a pressure in this container. The container may, for example, be a pneumatic actuator. Via the second pressure adapter 460, the second pressure sensor 450 may be acted on with a second pressure. The second pressure sensor 450 is constructed to quantify the second pressure which is supplied to it via the second pressure adapter 460. The first pressure sensor 400 and the second pressure sensor 450 are constructed according to the prior art.

The first pressure sensor 400 is connected to the second printed circuit board 370 by means of a first electrical connection 420. The second pressure sensor 450 is also connected to the second printed circuit board 370 by means of a second electrical connection 470. On the second printed circuit board 370, there may be arranged one or more evaluation circuits for evaluating signals supplied by the pressure sensors 400, 450.

The housing 200 of the sensor module 100 has a cable adapter 240 which is fitted to the frame 220 of the housing 200. The cable adapter is constructed in a substantially hollow-cylindrical manner. The frame 220 and the cable adapter 240 are preferably constructed in an integral manner.

Through the cable adapter 240, a cable 250 is guided from the outer side inside the housing 200. The cable 250 may, for example, be used to connect the sensor module 100 to an electronic transmission control system (transmission control unit; TCU). The cable 250 has a plurality of strands 255 which are connected to the second printed circuit board 370 in an electrically conductive manner in the region of a cable connection 260.

FIG. 3 is a view of the housing 200 of the sensor module 100 from below. The base plate 230 of the housing 200 can be seen in FIG. 3. It can be seen that the base plate 230 of the housing 200 has a recess 235 which is provided in a region of the base plate 230 which adjoins the region of the frame 220 in which the cable adapter 240 is arranged. Consequently, a portion of the cable 250 that extends inside the housing 200, the strands 255 of the cable 250 and the cable connection 260 are accessible through the recess 235.

In the illustration of FIG. 3, the recess 235 of the base plate 230 is closed by means of a cover 236. The cover 236 is constructed in a semi-transparent manner in the illustrated example. However, the cover 236 could also be constructed in a non-transparent manner.

It can further be seen in FIG. 3 that the base plate 230 of the housing 200 has a plurality of securing holes by means of which the housing 200 of the sensor module 100 can be secured to a carrier device.

Figure 4:
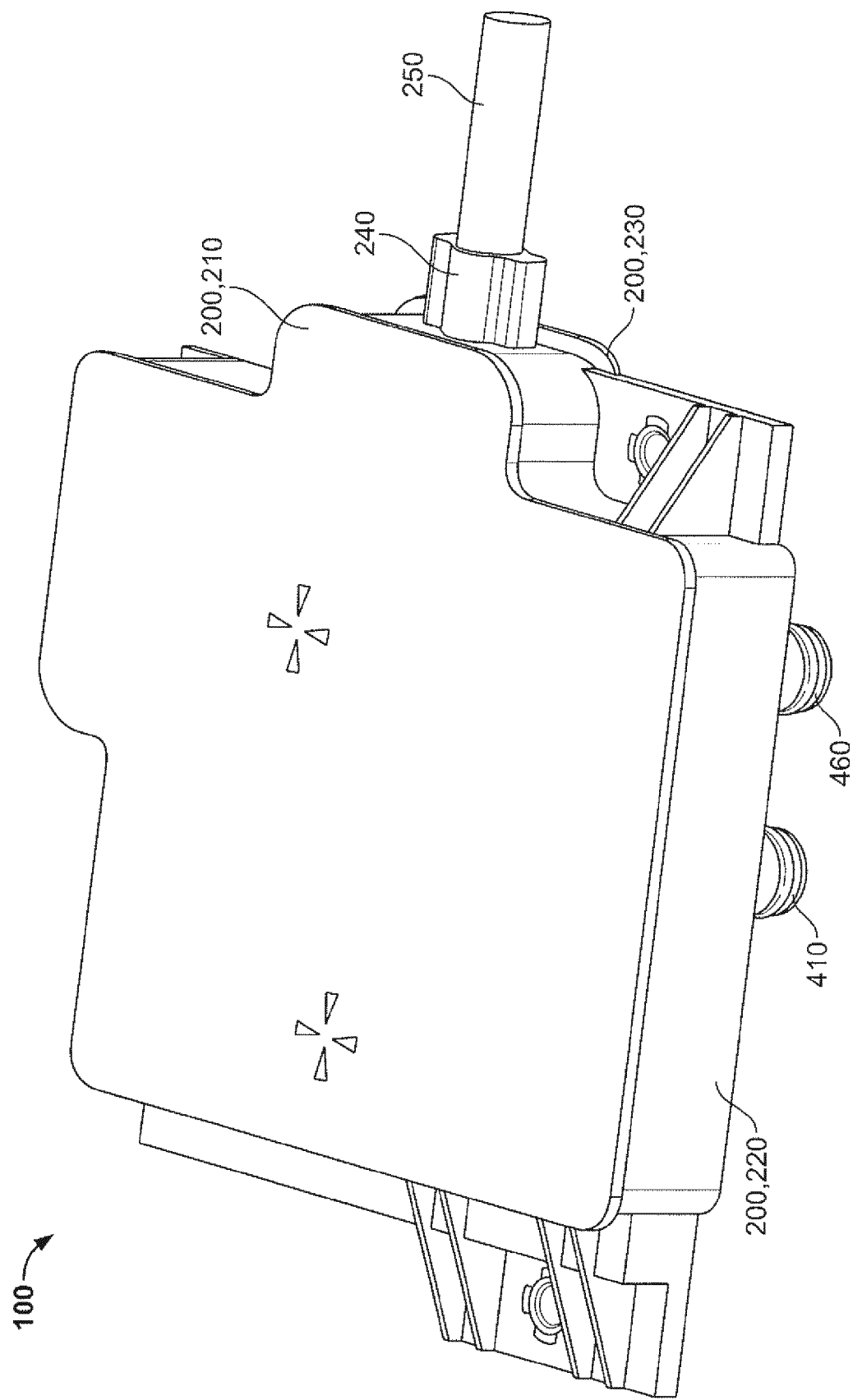
FIG. 4 is a view of the sensor module which is closed by means of a covering plate.

FIG. 4 is another view of the sensor module 100. In the illustration of FIG. 4, the housing 200 of the sensor module 100 is closed with the cover plate 210. The cover plate 210 may be connected to the frame 220 of the housing 200 by means of a screw connection, an adhesive-bonding connection, a weld connection or another connection. The connection is preferably constructed so as to be air-tight and fluid-tight between the cover plate 210 and the frame 220 of the housing 200. The connection between the cover 236 which closes the recess 235 of the base plate 230 and the base plate 230 is preferably also constructed in an air-tight and fluid-tight manner.

Figure 5:
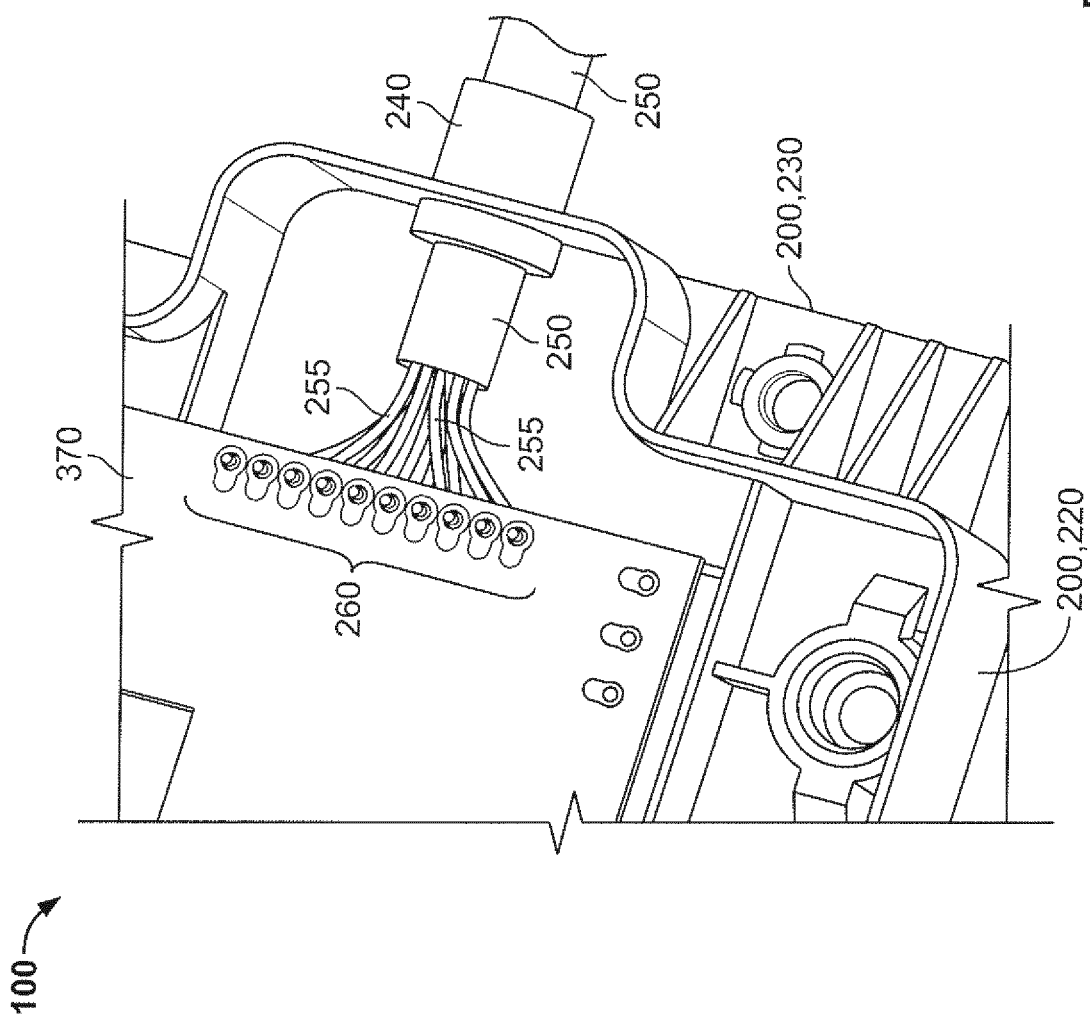
FIG. 5 is a detailed view of a cable adapter of the sensor module.
Figure 6:
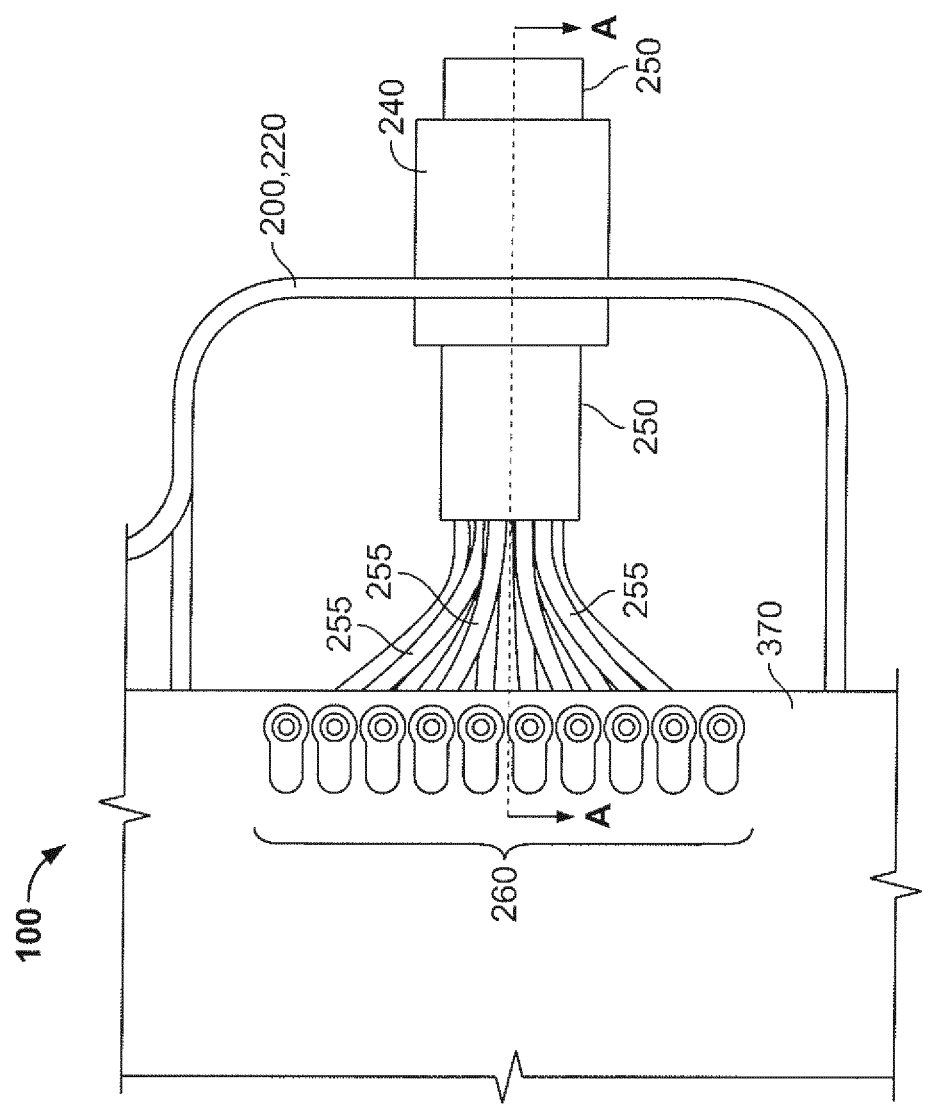
FIG. 6 is another view of the cable adapter.

FIGS. 5 and 6 are detailed views of the region of the housing 200 of the sensor module 100 having the cable adapter 240. In the illustration of FIG. 5, the second pressure sensor 450 has been removed for the sake of clarity. The cable 250 is guided inside the housing 200 by means of the cable adapter 240. The strands 255 of the cable 250 are connected to the second printed circuit board 370 in the region of the cable connection 260. A pull on the cable 250 could lead to damage of the cable connection 260. In order to prevent this, it is desirable to provide a tension relief member for the cable 250 in the region of the cable adapter 240. Such a tension relief member may be produced, for example, by means of injection moulding.

Figure 7:
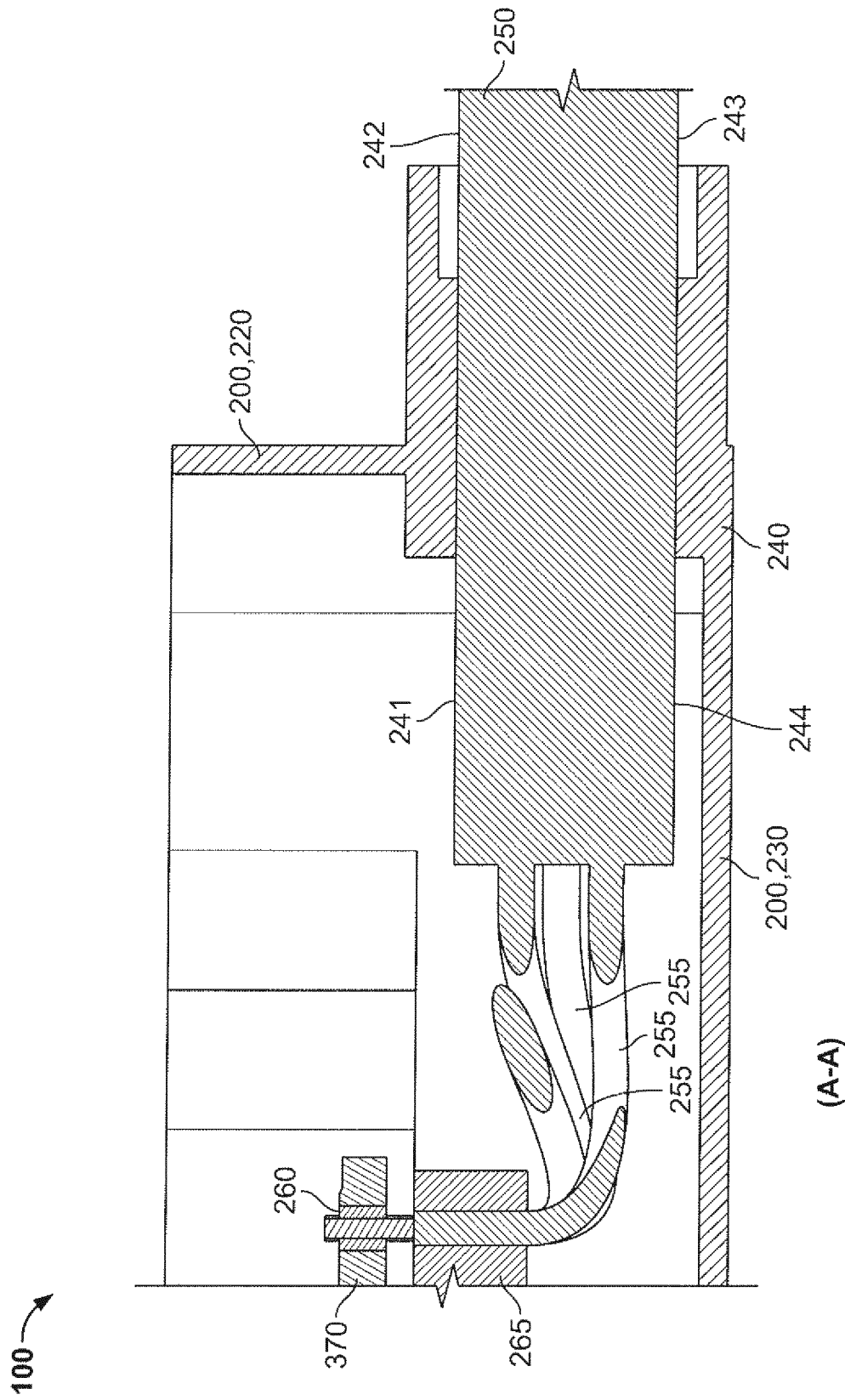
FIG. 7 is a section through the cable adapter and a cable.

FIG. 7 is a section through the cable adapter 240 and the cable 250 which extends through the cable adapter 240 along a line of section drawn in FIG. 6. In order to inject a tension relief member for the cable 250 on the cable adapter 240 by means of injection moulding, it is necessary to fix the cable 250 arranged in the cable adapter 240 at a first fixing point 241, a second fixing point 242, a third fixing point 243 and a fourth fixing point 244. The first fixing point 241 and the fourth fixing point 244 are located inside the housing 200. The second fixing point 242 and the third fixing point 243 are located outside the housing 200. The first fixing point 241 and the second fixing point 242 are located at a side of the cable 250 facing the cover plate 210 of the housing 200. The third fixing point 243 and the fourth fixing point 244 are located at a side of the cable 250 facing the base plate 230 of the housing 200. If the cable 250 were not to be fixed to the four fixing points 241, 242, 243, 244 during the injection-moulding operation, the cable 250 could move during the injection-moulding operation, whereby injection-moulding material could be introduced into the cover of the cable 250, which could lead to damage of the cable 250 or other portions of the sensor module 100.

In the illustration of FIG. 7, the cable connection 260 between the strands 255 of the cable 250 and the second printed circuit board 370 is produced by means of a female connector 265 which is secured to the strands 255 of the cable 250. However, the female connector 265 could also be dispensed with. In this case, the strands 255 of the cable 250 may be soldered directly to the printed circuit board 370 in the region of the cable connection 260.

Figure 8:
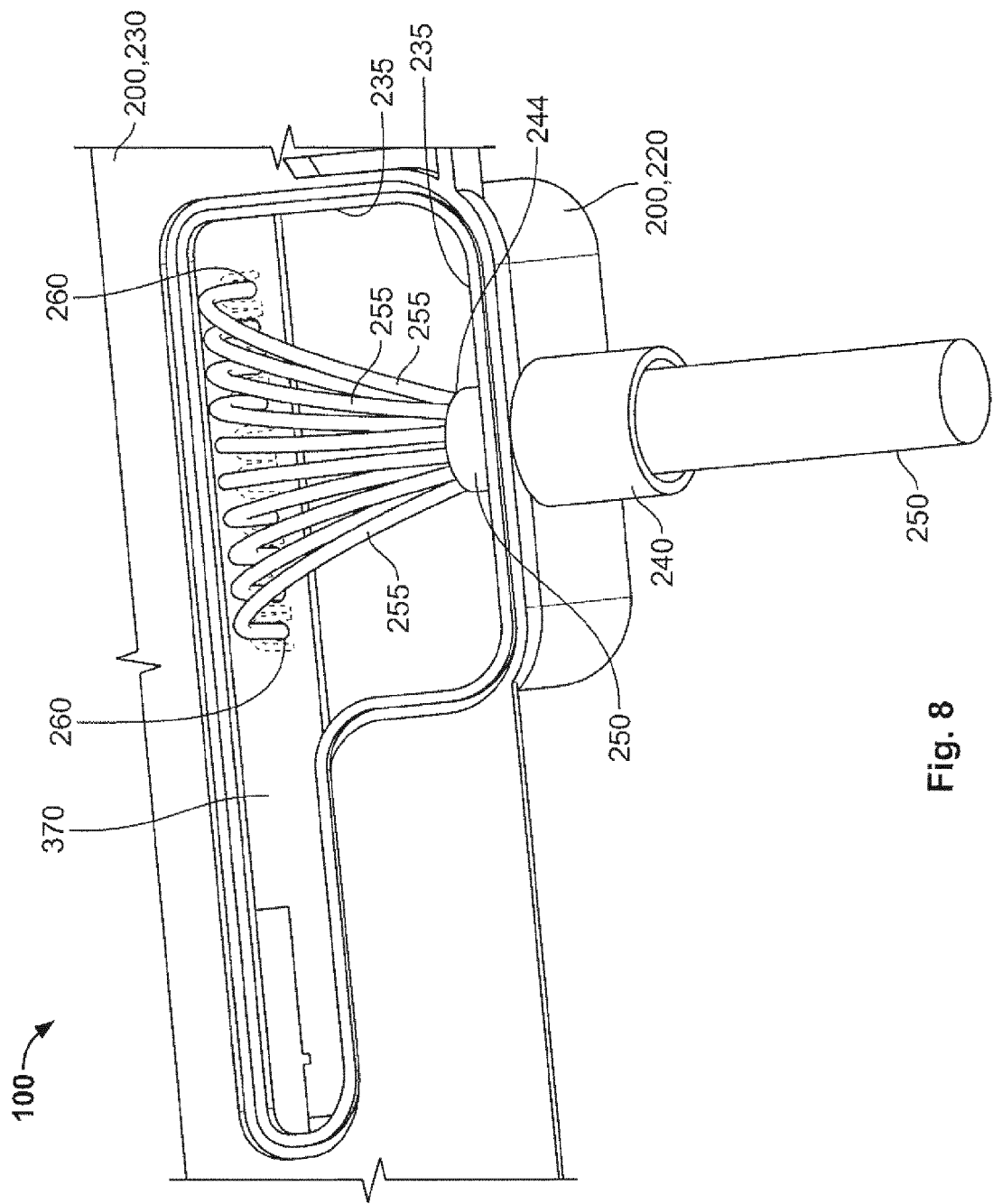
FIG. 8 is a view of a recess of a base plate of the sensor module.
Figure 9:
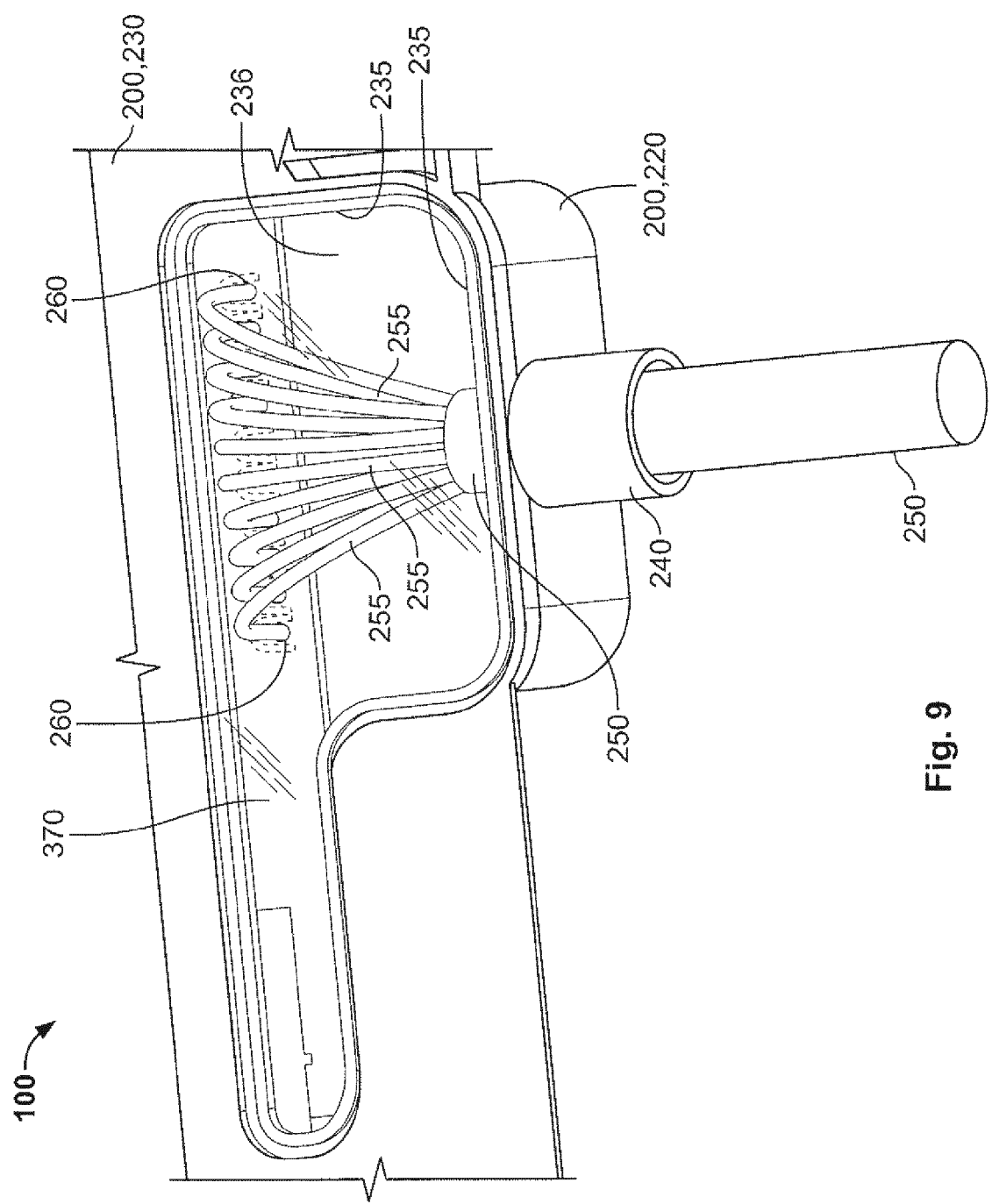
FIG. 9 is a view of a cover for the recess of the base plate.

FIG. 8 is another detailed view of the region of the housing 200 of the sensor module 100 comprising the cable adapter 240. In FIG. 8, it can be seen that the base plate 230 of the housing 200 has the recess 235 which is provided to make the fourth fixing point 244 of the cable 250 accessible. If the recess 235 of the base plate 230 is open, that is to say, not closed by means of the cover 236, the cable 250 can be fixed by means of a suitable tool to all four fixing points 241, 242, 243, 244 in order to subsequently inject a tension relief member for the cable 250 in the region of the cable adapter 240. Owing to the fixing of the cable 250 at the fixing points 241, 242, 243, 244, it is ensured that the cable 250 does not move during the injection-moulding operation. Subsequently, the recess 235 of the base plate 230 can be closed by means of the cover 236. This is illustrated in FIG. 9.

Figure 10:
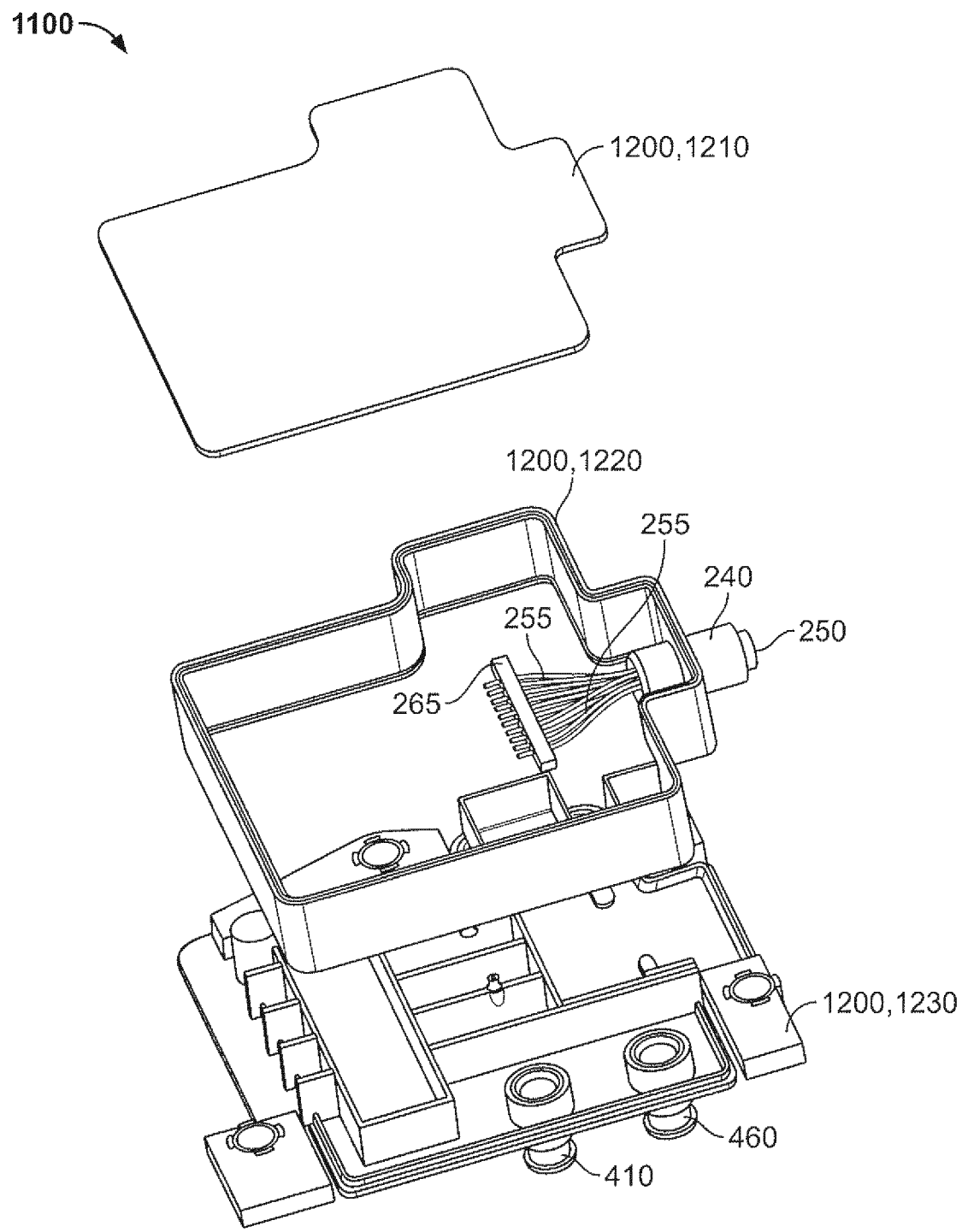
FIG. 10 is an exploded view of a housing of a sensor module according to a second embodiment.

FIG. 10 is an exploded view of a housing 1200 of a sensor module 1100 according to a second embodiment. The housing 1200 of the sensor module 1100 according to the second embodiment differs from the housing 200 of the sensor module 100 of the first embodiment. Otherwise, however, the sensor module 1100 corresponds to the sensor module 100 according to the first embodiment. In particular in the sensor module 1100, the same components are arranged in the housing 1200 as in the housing 200 of the sensor module 100 according to the first embodiment.

The housing 1200 comprises a cover plate 1210, a frame 1220 and a base plate 1230. The cover plate 1210 of the housing 1200 corresponds to the cover plate 210 of the housing 200. The frame 1220 of the housing 1200 corresponds to the frame 220 of the housing 200. The base plate 1230 of the housing 1200 corresponds to the base plate 230 of the housing 200. However, the frame 1220 and the base plate 1230 of the housing 1200 are constructed as separate components. The frame 1220 and the base plate 1230 are consequently not constructed in an integral manner. However, the frame 1220 and the base plate 1230 may be connected to each other. The frame 1220 and the base plate 1230 may preferably be connected to each other in an air-tight and fluid-tight manner.

Figure 11:
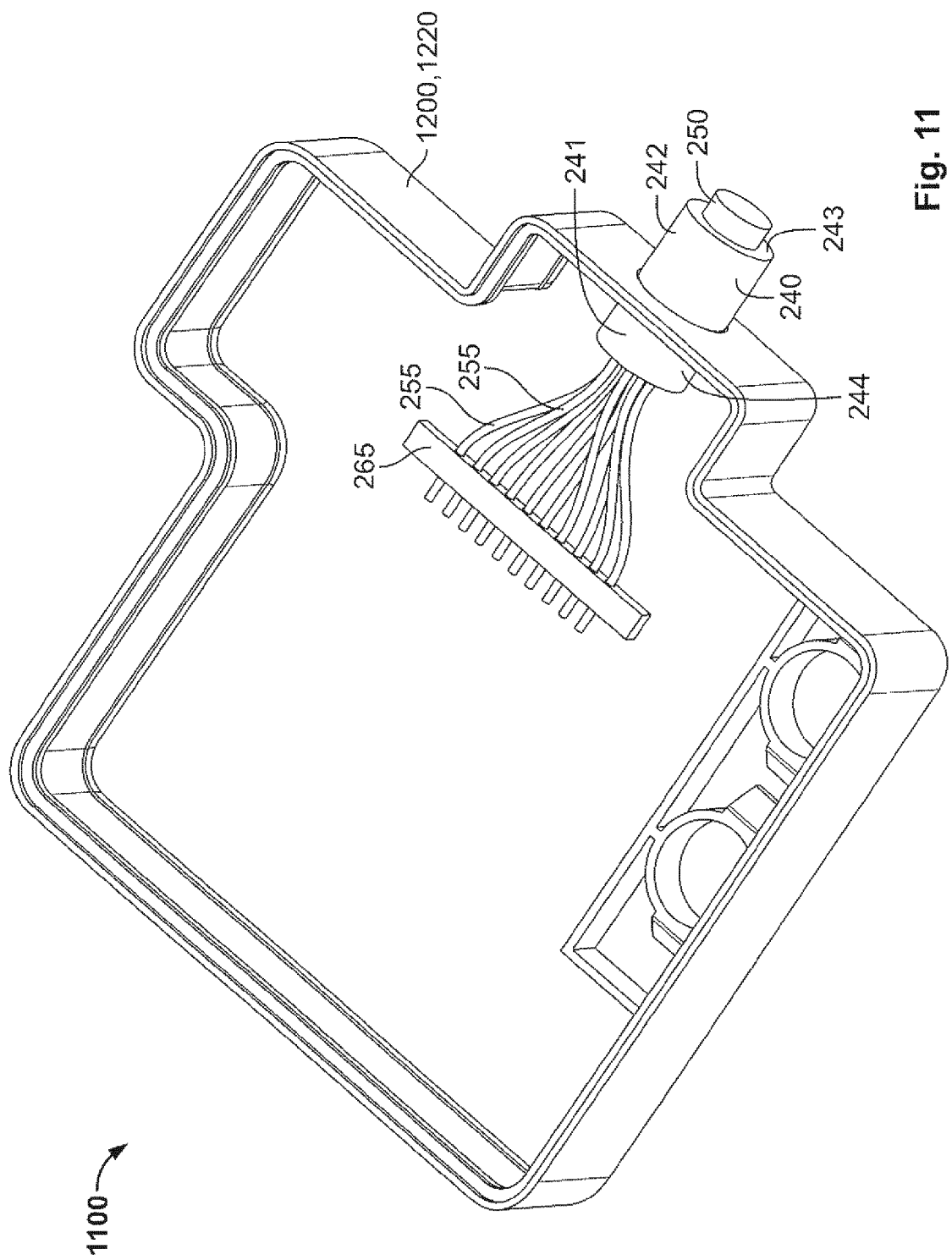
FIG. 11 shows a frame of the housing of the sensor module of the second embodiment.

FIG. 11 is a detailed view of the frame 1220 of the housing 1200 of the sensor module 1100 of the second embodiment. The frame 1220 has a hollow-cylindrical cable adapter 240, through which a cable 250 is guided into the inner side of the housing 1200 from the outer side. The cable 250 in turn has a plurality of strands 255 which are provided to be connected in the region of a cable connection 260 to a printed circuit board of the sensor module 1100. In the embodiment illustrated in FIG. 11, the strands 255 of the cable 250 are connected for this purpose to a female connector 265. The female connector 265 may be fitted to a suitable plug type connector of the printed circuit board.

In order to protect the cable 250 and the remaining components of the sensor module 1100 from damage, it is necessary to mould a tension relief member on the cable adapter 240 and the cable 250 in the region of the cable adapter 240. To this end, it is again necessary to fix the cable 250 to a first fixing point 241, a second fixing point 242, a third fixing point 243 and a fourth fixing point 244. Advantageously, in the sensor module 1100 of the second embodiment, all four fixing points 241, 242, 243, 244 are readily accessible as long as the frame 1220 of the housing 1200 is not yet connected to the covering plate 1210 and the base plate 1230 of the housing 1200.

In order to produce the sensor module 1100 of the second embodiment, therefore, the cable 250 is preferably first guided through the cable adapter 240 of the frame 1220. Subsequently, the cable 250 is fixed at the fixing points 241, 242, 243, 244. In the fixed state of the cable 250, a tension relief member can be moulded on the cable adapter 240 and the cable 250, for example, by means of injection moulding. The frame 1220 is subsequently connected to the base plate 1230 and the cover plate 1210.

The invention claimed is:
1. A sensor module having a housing, a first displacement sensor adapted for sensing a position of a first measurement object external to the housing, and a first pressure sensor being arranged in the housing, the sensor module having a first pressure adapter which is arranged at an outer side of the housing, the first pressure sensor being able to be acted on with pressure by means of the first pressure adapter.

2. The sensor module according to claim 1, wherein the first displacement sensor being a permanent-magnetic linear contactless displacement sensor.

3. The sensor module according to claim 1, wherein the displacement sensor comprising a coil having a magnetically soft core and an evaluation circuit.

4. The sensor module according to claim 1, wherein the sensor module having a second displacement sensor adapted for sensing a position of a second measurement object external to the housing, a second pressure sensor, and a second pressure adapter.

5. The sensor module according to claim 4, wherein the first and second displacement sensors operate in a contactless manner so that no mechanical interaction is required between the displacement sensors and the measurement objects.

6. The sensor module according to claim 1, wherein the sensor module having a cable which leads into the housing and a tension relief member for the cable being molded on the housing.

7. The sensor according to claim 6, wherein the housing having a cable adapter, the cable being guided into the housing through the cable adapter.

8. The sensor module according to claim 1, wherein the housing comprising a frame, a base plate, and a cover plate.

9. The sensor module according to claim 8, wherein the first pressure adapter being arranged on the base plate.

10. The sensor module according to claim 8, wherein the frame and the base plate being constructed in an integral manner.

11. The sensor module according to claim 10, wherein the base plate having a recess which can be closed by means of a cover.

12. The sensor module according to claim 8, wherein the frame and the base plate being constructed in a separable manner.

13. The sensor module according to claim 1, wherein the displacement sensor further comprises a first printed circuit board.

14. The sensor module according to claim 13, wherein the displacement sensor further comprises an evaluation circuit in the form of a first integrated switching circuit arranged on the first printed circuit board.

15. The sensor module according to claim 14, wherein the first integrated switching circuit is constructed as an application-specific integrated circuit (ASIC).

16. The sensor module according to claim 13, further comprising a second displacement sensor for sensing a position of a second measurement object external to the housing, a second pressure sensor, and a second pressure adapter.

17. The sensor module according to claim 16, wherein:
the second displacement sensor further comprises a second printed circuit board;
the second displacement sensor further comprises an evaluation circuit in the form of a second integrated switching circuit arranged on the second printed circuit board; and
the first integrated switching circuit is constructed as an application-specific integrated circuit (ASIC).

18. The sensor module according to claim 17, wherein the first printed circuit board of the first displacement sensor and the second printed circuit board of the second displacement sensor are electrically connected to each other by an intermediate connection, whereby electrical signals can be transmitted between the first and second printed circuit boards.

19. The sensor module according to claim 18, wherein the first pressure sensor is connected to the second printed circuit board by means of a first electrical connection and the second pressure sensor is also connected to the second printed circuit board by means of a second electrical connection.

20. The sensor module according to claim 18, wherein one or more evaluation circuits are arranged on the second printed circuit board for evaluating signals supplied by the pressure sensors.

* * * * *